United States Patent

Suzuki et al.

Patent Number: 5,167,861
Date of Patent: Dec. 1, 1992

[54] NOVEL LIQUID CRYSTAL COMPOUNDS

[75] Inventors: Yoshiichi Suzuki; Takashi Hagawara, both of Tokyo, Japan

[73] Assignee: Showa Shell Sekiyu K.K., Tokyo, Japan

[21] Appl. No.: 376,473

[22] Filed: Jul. 7, 1989

[30] Foreign Application Priority Data

Jul. 8, 1988 [JP] Japan .................. 63-168880

[51] Int. Cl.$^5$ .............. C09K 19/12; C09K 19/20; C07C 69/76
[52] U.S. Cl. ................ 252/299.65; 252/299.66; 252/299.67; 560/65; 560/102
[58] Field of Search ............ 252/299.66, 299.67, 252/299.65; 560/102, 65

[56] References Cited

U.S. PATENT DOCUMENTS

| | | | |
|---|---|---|---|
| 4,613,209 | 9/1986 | Goodby et al. | 350/350 S |
| 4,753,752 | 6/1988 | Raynes et al. | 252/299.65 |
| 4,871,472 | 9/1989 | Krause et al. | 252/299.65 |
| 4,973,738 | 11/1990 | Suzuki et al. | 560/80 |
| 5,073,306 | 12/1991 | Nohura et al. | 252/299.61 |

FOREIGN PATENT DOCUMENTS 0194659 9/1986 European Pat. Off. ....... 252/299.66

Primary Examiner—Robert L. Stoll
Assistant Examiner—C. Harris
Attorney, Agent, or Firm—Sughrue, Mion, Zinn, Macpeak & Seas

[57] ABSTRACT

Novel ferroelectric liquid crystal compounds showing three stable liquid crystal states so as to give particular optical response wave shape as well as particular optical and electric responses to impressed voltage of triangle wave shape in comparison with usual ferroelectric liquid crystals of bistable phase, whereby it is possible to provide electrooptical devices having larger picture area at lower cost. Typical compounds are represented by

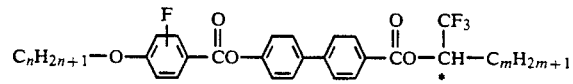

or

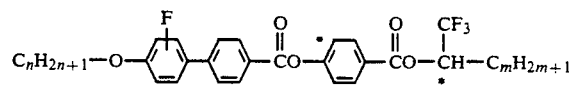

wherein n is an integer of 3-18 and m is an integer of 5-12.

14 Claims, 7 Drawing Sheets

NOVEL LIQUID CRYSTAL COMPOUNDS

BACKGROUND OF THE INVENTION AND RELATED ART

The invention relates generally to new ferroelectric chiral smectic liquid crystals, and more particularly to novel liquid crystals showing three stable states or tristable phase to be preferably used as a display element and above all for an electrooptical device owing to particularly high speed of response to an electric field.

Various electrooptical devices utilizing liquid crystals of nematic type have been developed and practically used in a dynamic scattering (DS) mode, twisted nematic (TN) mode, guest-host (G-H) mode and supertwisted nematic (STN) mode. Such devices are, however, not satisfactory due to the slow speed of response of the liquid crystals in the order of several m. sec.-several decades of m. sec. The reason why the response speed is slow is considered to lie in that torque to move liquid crystal molecules, which depends on the anisotropy of dielectric constant, is not so strong.

In order to solve such problem, ferroelectric liquid crystals were found and developed by Meyer et al (Le Journal de Physique, 36, 1975, 1-69), which have an spontaneous polarization (Ps) and consequently a higher value of the torque=Ps x E (impressed voltage), which results in the higher response time speed in the order of several $\mu$sec. to several decades of $\mu$sec. In JP-A63-307,837, improved ferroelectric bistable liquid crystals are disclosed.

Figure 5:
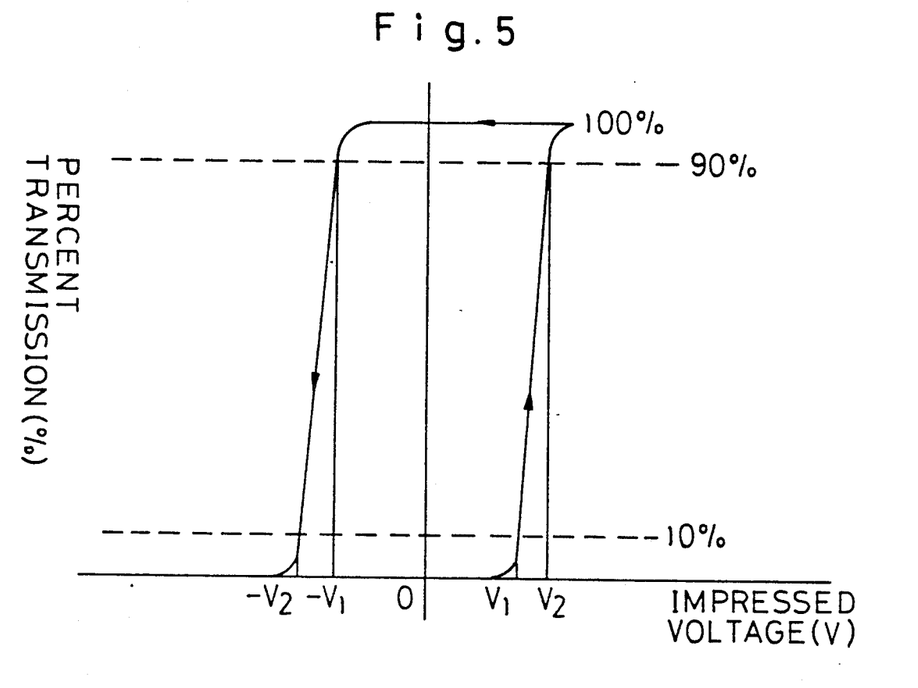
FIG. 5 is a coordinate in which the ordinate is a permission (%) and the abscissa is an impressed voltage, showing a hysteresis of the liquid crystal of ideal bistable phase.

Meanwhile, an electrooptical device utilizing liquid crystals of said ferroelectric liquid crystals have been proposed. For instance, JP-A Sho56-107,216 discloses a device in which two molecular orientations, which are made parallel to a wall surface by releasing the twisted structure thereof owing to the force of the wall surface, may be varied depending the polarity the impressed electric field. This is, however, theoretically based on the presence of a liquid crystal showing an ideal bistable phase as shown in wave shapes of response to the electric field as shown in FIG. 5.

Figure 6:
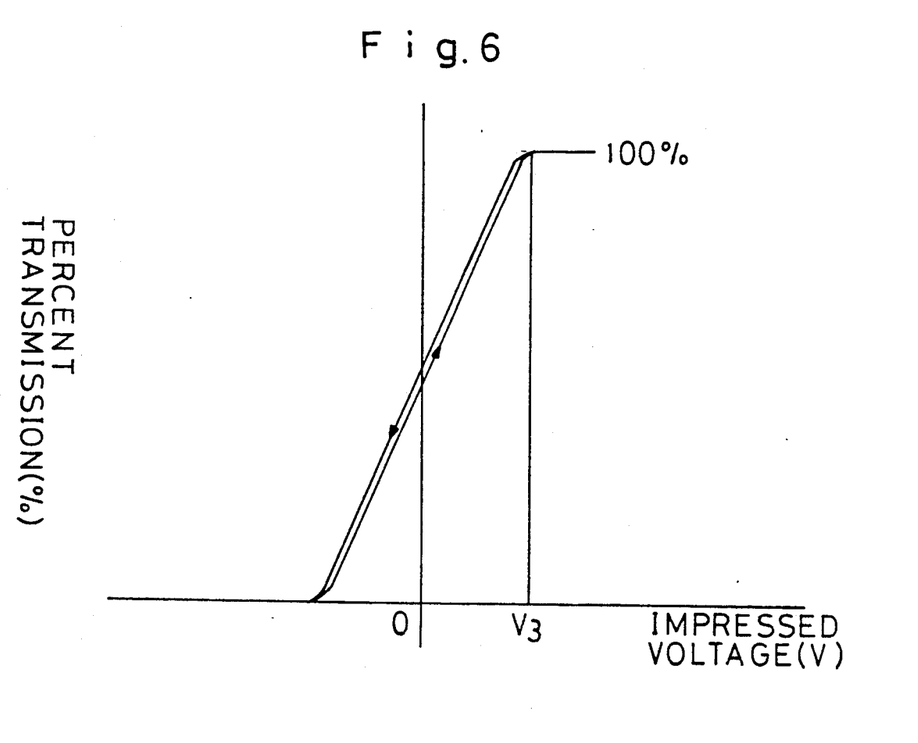
FIG. 6 is a similar view of a typical one of the liquid crystals having actually been provided until now.
Figure 7:
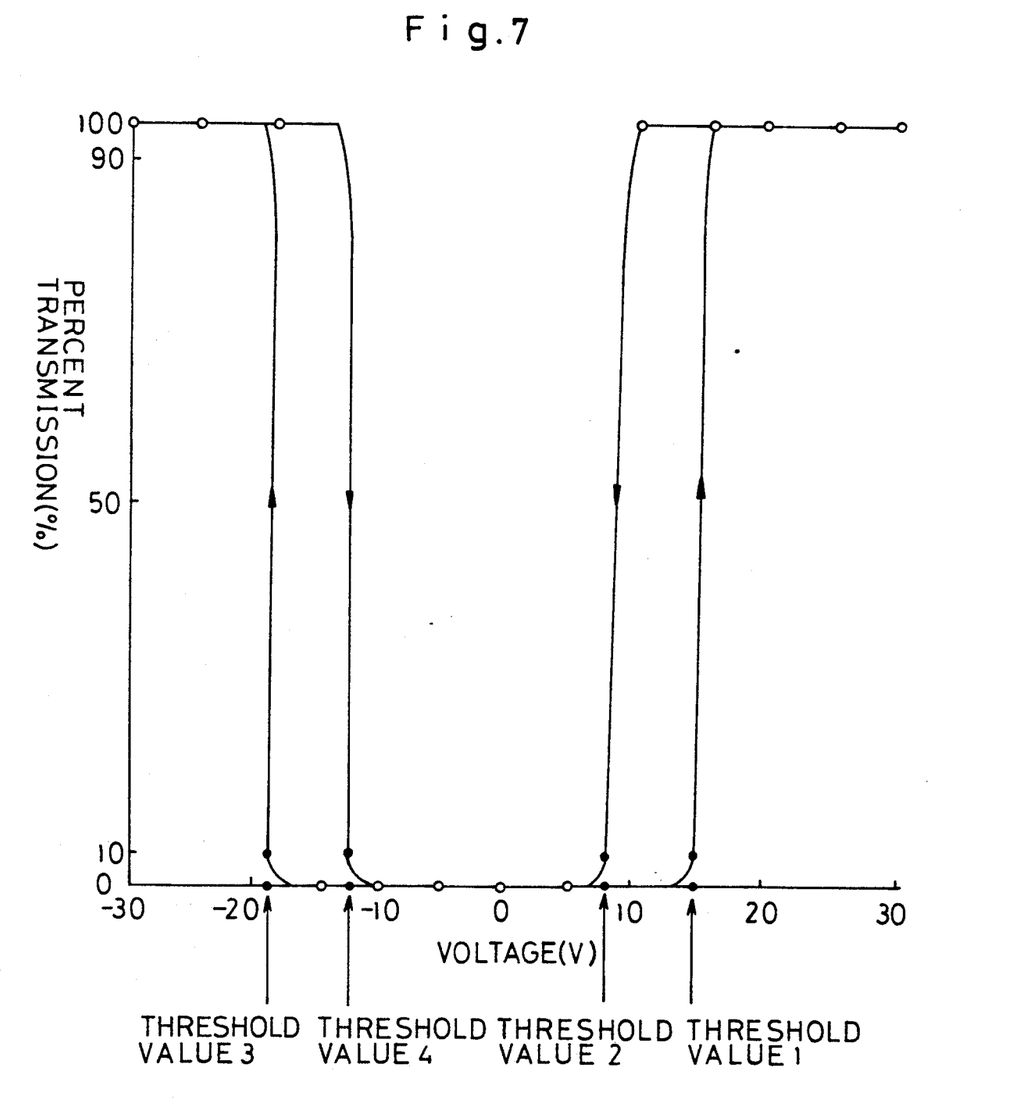
FIG. 7 is a similar view of a liquid crystal of tristable phase according to the invention.

In fact, however, such ideal compounds have not yet been found. The actually provided liquid crystals of bistable phase show the wave shapes of response as shown in FIG. 6. When using such liquid crystal e.g. in a photoswitching circuit, as the impressed voltage is changed from the ⊖ side to the ⊕ side, the transmission factor (%) is gradually changed so that the simple ON-OFF change of the impressed voltage cannot sufficiently attain the purpose.

Furthermore, so far as the liquid crystals of bistable phase having been synthesized until now are concerned, it can not realize a monodomain state, which is a perfect molecular orientation, in the Sc* state where there is no electric field, but results in a disorder of the molecular orientation which is called "twist". Thus, it is difficult to realize perfect two states orientation as referred to, above all in a larger area.

Furthermore, when dynamically driving, inevitably the contrast is lowered and the visual field angle is narrowed due to the low threshold of the voltage causing a change of brightness in a specific range. Since the liquid crystals of bistable phase having been synthesized until now show not the hysteresis as shown in FIG. 5 but that as shown in FIG. 6 so as not to have the memory effect. In order to hold the stable Sc* phase for the liquid crystals, it is necessary to continuously impress the voltage $V_3$ in FIG. 6 or continuously apply a high frequency, either of which causes a considerably much amount of energy loss.

SUMMARY OF THE INVENTION

It is an object of the invention, thus, to provide novel ferroelectric chiral smectic liquid crystal compounds of tristable phase, which may realize a stable molecular orientation which makes it possible to give a definite light-dark contrast in the non-electric field state and attain a definite threshold property as well as hysterisis, and make it possible attain the dynamic driving as well as the high speed of response.

Other objects of the invention and various advantages attained thereby are appreciated by those skilled in the art by studying the detailed explanation of the invention to be given hereafter.

Said objects can be attained by novel liquid crystal compounds of the invention represented by the general formula;

in which $R_1$ means an alkyl group having 3-18 carbon atoms, A, B respectively means a phenyl or biphenyl group which may be substituted with a halogen atom and either of which must be substituted with a halogen atom, $R_2$ means $CF_3$, $CHF_2$, $CH_2F$, $C_2F_5$ or perfluoropropyl, $R_3$ means an alkyl group having 3-15 carbon atoms, and * represents an optically active center.

DESCRIPTION OF THE DRAWINGS

FIG. 8(A) shows impressed triangle wave voltage, FIGS., (B), (C) and (D) respectively show optical response of a marketed nematic liquid crystal, a known ferroelectric liquid crystal of bistable phase, and a liquid crystal of tristable phase of the invention.

DESCRIPTION OF PREFERRED EMBODIMENTS OF THE INVENTION

Figure 8A:
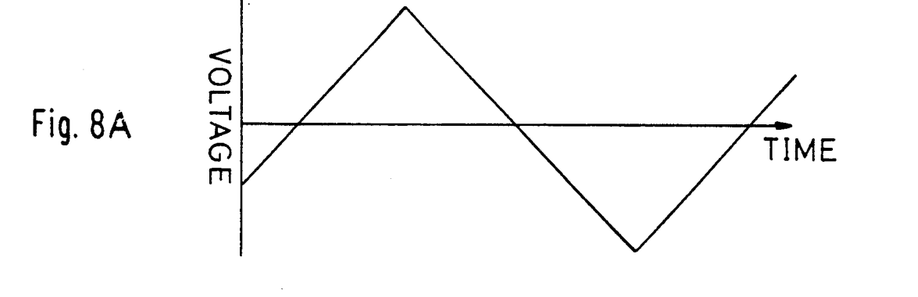
Figure 8B:
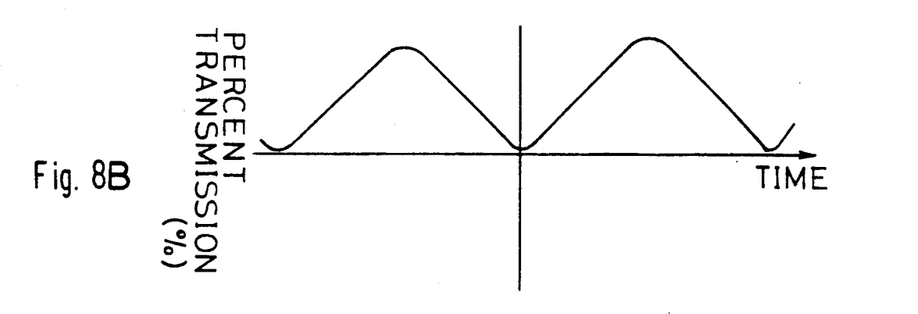
Figure 8C:
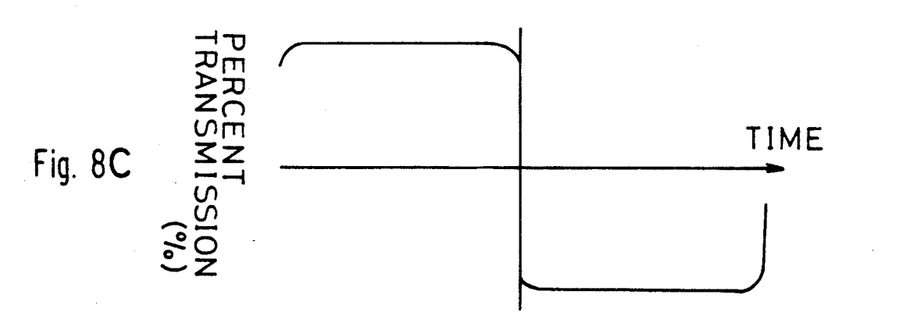
Figure 8D:
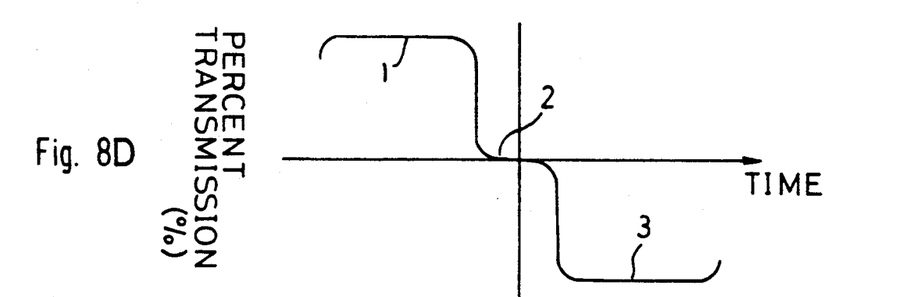

Before disclosing preferred embodiments of the invention, it will be preferable to make some explanation on the tristable phase. When the voltage is impressed as the triangle wave shapes as shown in FIG. 8 (A) across the two electrode substrates between which ferroelectric liquid crystal is filled, said liquid crystal shows the first stable state (see (1) in FIG. 9 (D) of molecular orientation when no electric field is applied, the second stable state (see (2) in FIG. 8 (D)) different from the first one when applying the electric field and the third stable state (see (3) in FIG. 8 (D) different also from the second one.

Any of the nematic liquid crystals and the ferroelectric liquid crystals of usual bistable phase, as seen from FIGS. 8 (B) and 8 (C).

When using the usual ferroelectric liquid crystals for the electrooptical devices, it is necessary to use a very complex active matrix system so that the manufacture thereof necessitates troublesome steps and consequently a high cost and that the device can not provide a large image or display area. According to the liquid crystals of the tristable phase, said defects can be almost completely overcome.

The novel ferroelectric liquid crystal compounds of the invention may be represented by the following general formula as referred to above.

$$R_1-O-A-\overset{O}{\underset{\|}{C}}O-B-\overset{O}{\underset{\|}{C}}O-\overset{R_2}{\underset{*}{C}H}-R_3$$

$R_1$ means an alkyl group having 3-18 carbon atoms, and preferably a straight chain alkyl of 5-12 carbon atoms such as hexyl, octyl, nonyl and decyl. A and B mean preferably either one of said two must be in which l is a halogen atom and preferably a fluorine atom.

$R_2$ means $CF_3$, $CHF_2$, $CH_2F$, $C_2F_5$ or perfluoropropyl, and preferably $CF_3$ or $C_2F_5$.

$R_3$ means an alkyl group having 3-15 carbon atoms, and preferably a straight chain alkyl group of 5-12 carbon atoms such as hexyl, octyl, nonyl or decyl.

Typical ones of the liquid crystal compounds are;

in which Ra means a straight chain alkyl group of 3-18 carbon atoms, Rb means a straight chain alkyl group of 5-12 carbon atoms, and * means an optically active center.

The novel ferroelectric liquid crystal compounds of the invention can be synthesized in principle according to the processes shown by the following flow charts.

[I]

(1)

(2)

(1) + (2) ⟶ (3)

[II]

(4)

(5)

-continued (4) + (5) ⟶ (6)

Said R₁, R₂, R₃ and * respectively the same meaning as referred to above.

The processes are explained as follows;

(I) 4-Alkoxyfluorobenzoic acid is reacted with thionyl chloride to obtain the acid chloride (1).

4-Phenol-benzoic acid is treated with methanol to be in the methyl ester, which is then treated with benzyl chloride and potassium carbonate to obtain 4'-benzyloxyphenyl-4-benzoic acid. The acid is treated with thionyl chloride to be in the acid chloride, which is treated with 1-optically active haloalkyl substituted alkanol to obtain the corresponding ester. The ester is hydrogenated under raised pressure of hydrogen in the presence of palladium/carbon catalyst to obtain 4-hydroxy-4'-biphenyl carboxylic-1-optically active haloalkyl substituted alkyl ester (2).

The compounds (1), (2) are reacted with each other to obtain 4'-(1-haloalkyl substituted alkyloxycarbonyl)-biphenyl 4-alkyloxy-fluoro substituted benzoate (3).

(II) 4'-Alkyloxy-fluoro substituted biphenyl-4-carboxylic acid is treated with thionyl chloride to obtain the acid chloride (4).

4-Benzyloxy-benzoic acid is reacted with thinyl chloride to obtain the corresponding acid chloride, which is treated with 1-optically active haloalkyl substituted alkanol to obtain 1-optically active haloalkyl substituted alkyl 4-benzyloxy-benzoic acid.

The 4-benzyloxy-benzoic acid is hydrogenated to obtain 1-optically active haloalkyl substituted alkyl 4-hydroxy-benzoic acid (5).

The compounds (4), (5) are reacted with each other to obtain 4-(1-optically active haloalkyl substituted alkyloxycarbonyl) phenyl 4'-n-alkoxy-fluoro substituted biphenyl-carboxylate (6).

EXAMPLE 1

(1) Synthesis of optically active 1,1,1-trifluoro-2-octyl-4-benzyloxybenzoate.

4-Benzyloxy-benzoic acid chloride in the amount of 4.3 g was dissolved in 50 ml methylene chloride, in which a solution of 2.9 g optically active 1,1,1-trifluoro-2-octanol, 0.6 g dimethylaminopyridine and 1.7 g triethylamine in 50 ml methylene chloride was added little by little under ice-water cooling.

The temperature of the reaction mixture was recovered to the room temperature to be reacted for a whole day and night, then taken in ice-water and extracted with methylene chloride. The methylene chloride phase was successively washed with diluted hydrochloric acid, water, 1N aqueous sodium carbonate solution and water in this order, dried over unhydrous magnesium sulfate for removing the solvent to obtain the crude product. The crude product was subjected to toluene/silica gel column chromatography and recrystalized from ethanol to obtain the product in the amount of 3.8 g.

(2) Synthesis of optically active 1,1,1-trifluoro-octyl-4-hydroxybenzoate.

The reaction product obtained in Example 1-(1) was dissolved in 100 ml methanol, added with 0.4 g 10% Pd/carbon and subjected to hydrogenation under hydrogen atmosphere to obtain the captioned product in the amount of 2.8 g.

(3) Synthesis of optically active 4-(1,1,1-trifluoro-2-octyloxycarbonyl)phenyl 3'-fluoro-4'-n-decyloxybiphenyl-4-carboxylate 3'-Fluoro-4'-n-decyloxybiphenyl-4-carboxylic acid chloride in the amount of 2.142 g, which was obtained by reaction of 3'-fluoro-4'-n-decyloxybiphenyl-4-carboxylic acid with thionyl chloride in the excessive amount, 1,513 g 1,1,1-trifluoro-2-octyl-4-hydroxybenzoate obtained in Example 1-(2), 0.528 g triethylamine and 0.182 g dimethylaminopyridine were dissolved in 90 ml methylene chloride at the room temperature to be stirred for about two days. The reaction mixture was taken in a large amount of water. The methylene chloride phase was recovered to be washed with water, diluted hydrochloric acid and water in this order. After dehydration with anhydrous magnesium sulfate, methylene chloride was distilled off. The residue was purified by means of silica gel column chromatography (developer, hexane: ethyl acetate=10:0.5 (V/V)) to obtain the objective compound in the amount of 4.944 g.

The specific rotatory power and the phase transition point (° C.) confirmed by microscope with hot stage of the objective liquid crystal compound are as follows;

$[\alpha]_D^{20} = +28.8°$

Said $S_{(3)}^*$ means a tristable phase.

EXAMPLE 2

Synthesis of optically active 4-(1,1,1-trifluoro-decyloxycarbonyl)phenyl 3,-fluoro-4'-n-decyloxybiphenyl-4-carboxylate.

The same processes were repeated as in Example 1 except that optically active 1,1,1-trifluoro-2-decanol instead of 1,1,1-trifluoro-2-octanol in Example 1-(1) to obtain the captioned objective compound.

The specific rotatory power as well as the phase transition point (° C.) similarly confirmed of said liquid crystal compound are;

$$[\alpha]_D^{20} = +29.9°$$

$S_{(3)}^*$ means a tristable phase.

EXAMPLE 3

(1) Synthesis of optically active 1,1,1-trifluolo-octyl 4'-hydroxybiphenyl-4-carboxylate 4-Hydroxy-4'-biphenylcarboxylic acid in the amount of 10 g was dissolved in methanol, added with a few drops of concentrated sulfuric acid and subjected to the reaction under reflux for 12 hours. After cooling down to the room temperature, the reaction mixture was taken in a large amount of water and neutralized to precipitate white crystal, which was filtered, sufficiently washed with water and recrystalized from methanol to obtain purified crystals of 4-hydroxy-4'-biphenylcarboxylic acid methyl ester in the amount of 8.5 g.

This reaction product and 4.7 g benzyl chloride were dissolved in 60 ml DMF and added with 20 g anhydrous potassium carbonate to be reacted under reflux for 6 hours. The reaction mixture was taken in water and the precipitated crystal was filtered to be sufficiently washed with a large amount of water so as to be neutral.

The obtained crystal and 4.2 g pulverized potassium hydroxide were taken in methanol to be heated and stirred under reflux for 6 hours. The reaction mixture was left to be of the room temperature, taken in water and neutralized with 3N hydrochloric acid. The precipitated white crystal was filtered, sufficiently washed with water and recrystalized to obtain 4-benzyloxy-4'-biphenylcarboxylic acid in the amount of 7 g.

The reaction product was added in 50 ml thionyl chloride and subjected to reaction under reflux for 6 hours. By distilling excessive thionyl chloride off in vacuo, 4'benzyloxy-4'-biphenylcarboxylic acid chloride was obtained in the solid state in the amount of 6.8 g.

The acid chloride was dissolved in 70 ml methylene chloride to be dropped in liquid mixture of 3.6 g optically active 1-trifluoromethylheptanol and 40 g pyridine under cooling with ice and reacted for a whole day and night at the room temperature.

The reaction mixture was taken in water and repeatedly extracted with methylene chloride. The collected organic phase was successively washed with 3N hydrochloric acid, water, 1N sodium carbonate and water in this order to be neutralized, dried over anhydrous magnesium sulfate, and after distilling the solvent off in vacuo subjected to silica gel column chromatography (developer, n-hexane and ethyl acetate) to obtain 4-benzyloxy-4'-biphenylcarboxylic acid 1-trifluoromethylheptyl ester in the amount of 2.8 g.

The reaction product and 0.3 g 10% palladium/carbon were added in methanol and hydrogenated in hydrogen under pressure to obtain the captioned product, optically active 1,1,1-trifluoro-2-octyl 4'-hydroxybiphenyl-4-carboxylate in the amount of 2.2 g.

(2) Synthesis of optically active 4'-(1,1,1-trifluoro-2-octyloxycarbonyl)biphenyl-(4) 2-fluoro-4-n-decyloxybenzoate

2-Fluoro-4-decyloxybenzoic acid in the amount of 1.9 g was added in 20 ml thionyl chloride to be reacted under reflux for 3 hours. By distilling excessive thionyl chloride off in vacuo, the corresponding acid chloride was obtained in the amount of 2.0 g.

Optically active 1,1,1-trifluoro-2-octyl-4'-hydroxybiphenyl-4-carboxylate obtained in Example 3-(1) in the amount of 2.2 g and 0.7 g triethylamine were added in methylene chloride, in which a solution of 2.0 g 2-fluoro-4-decyloxybenzoic acid chloride in methylene chloride was gradually dropped. The liquid mixture was then subjected to the reaction at the room temperature for a whole day and night, taken in water and repeatedly extracted with ether. The organic phase was sufficiently washed to be neutralized, dried over anhydrous magnesium sulfate, and after distilling the solvent off subjected to silica gel column chromatography (developper, n-hexane and ethyl acetate). By repeatedly recrystallizing from anhydrous ethanol, the captioned product was obtained in the amount of 0.8 g.

EXAMPLES 4 AND 5

The same processes were repeated as in Example 3 except that 2-fluoro-4-octyloxybenzoic acid (Example 4) and 2-fluoro-4-nonyloxybenzoic acid (Example 5) were used instead of 2-fluoro-4-decyloxybenzoic acid used in Example 3-(2) to obtain the following objective compounds.

Example 4: Optically Active 4'-(1,1,1-trifluoro-2-octyloxycarbonyl)biphenyl-(4) 2-fluoro-4-n-octyloxybenzoate

Example 5: Optically active 4'-(1,1,1-trifluoro-2-octyloxycarbonyl)biphenyl-(4) 2-fluoro-4-n-nonyloxybenzoate The specific rotatory powers $[\alpha]^{20}_D$ and the phase transition points (° C.) of the three objective compounds are as follows;

objective liquid crystal compounds of the invention are respectively shown in the accompanying drawings and following tables.

Figure 1:
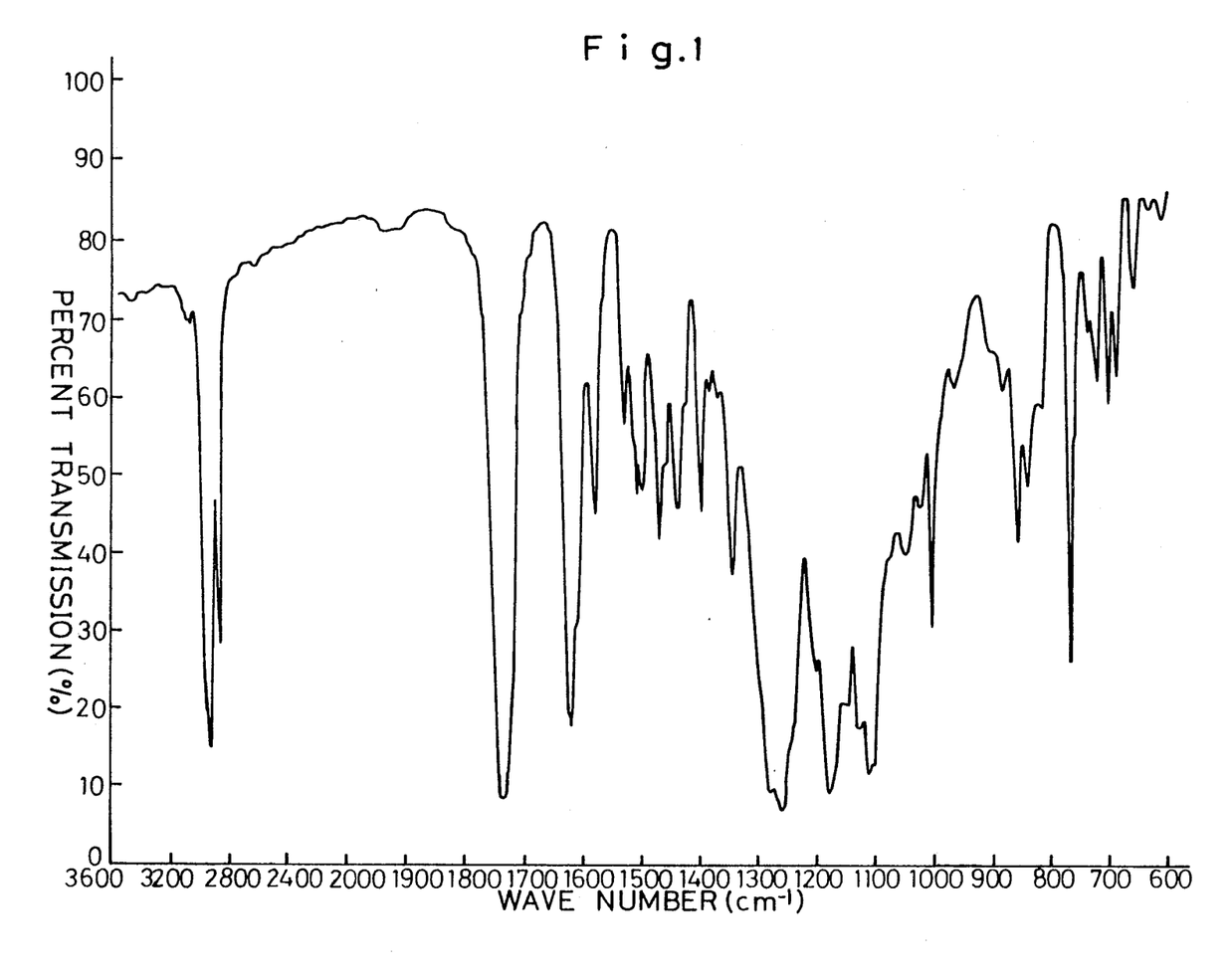
FIG. 1 shows an infrared absorption spectrum (KBr) of the objective compound in Example 4.
Figure 2:
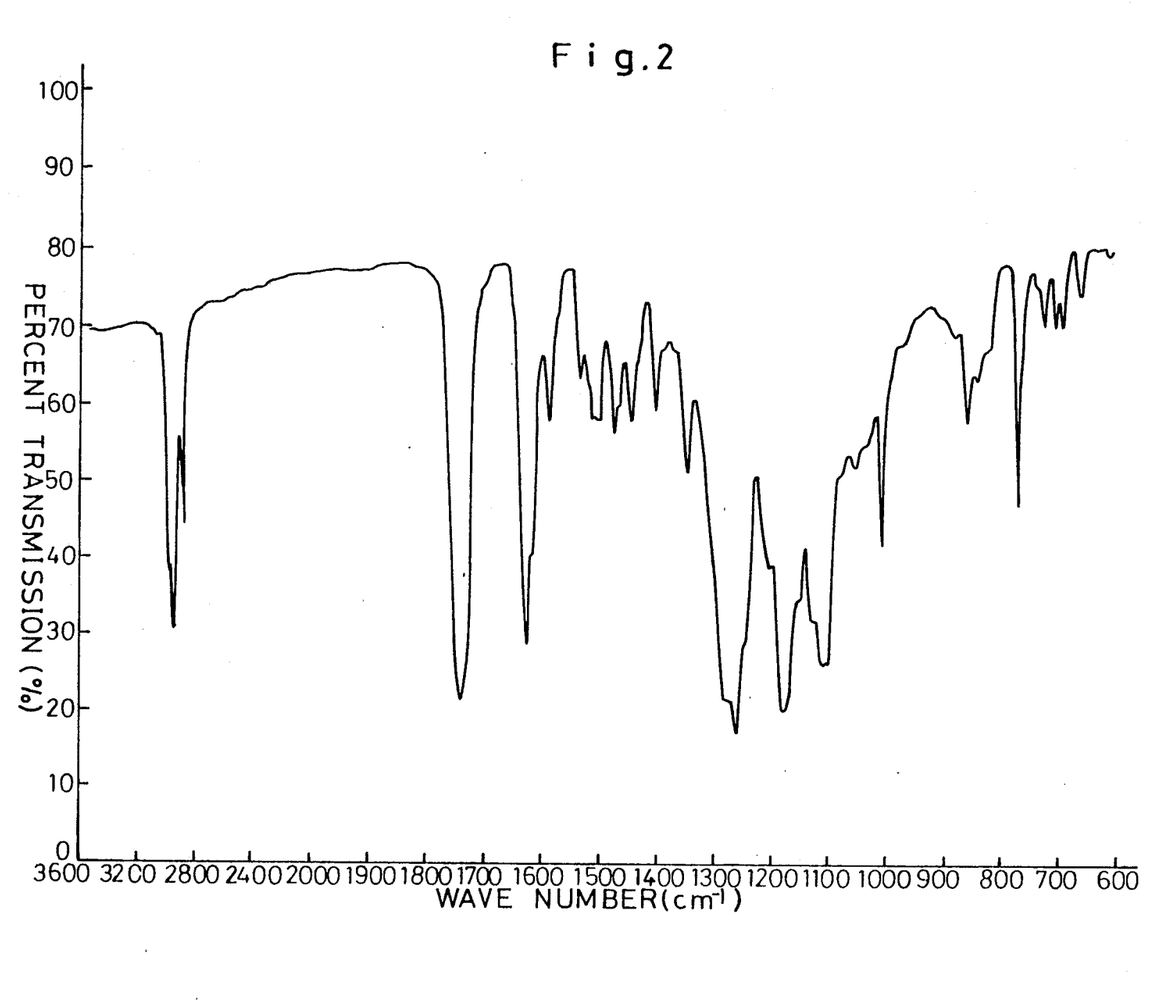
FIG. 2 is a similar view of the objective compound in Example 5.
Figure 3:
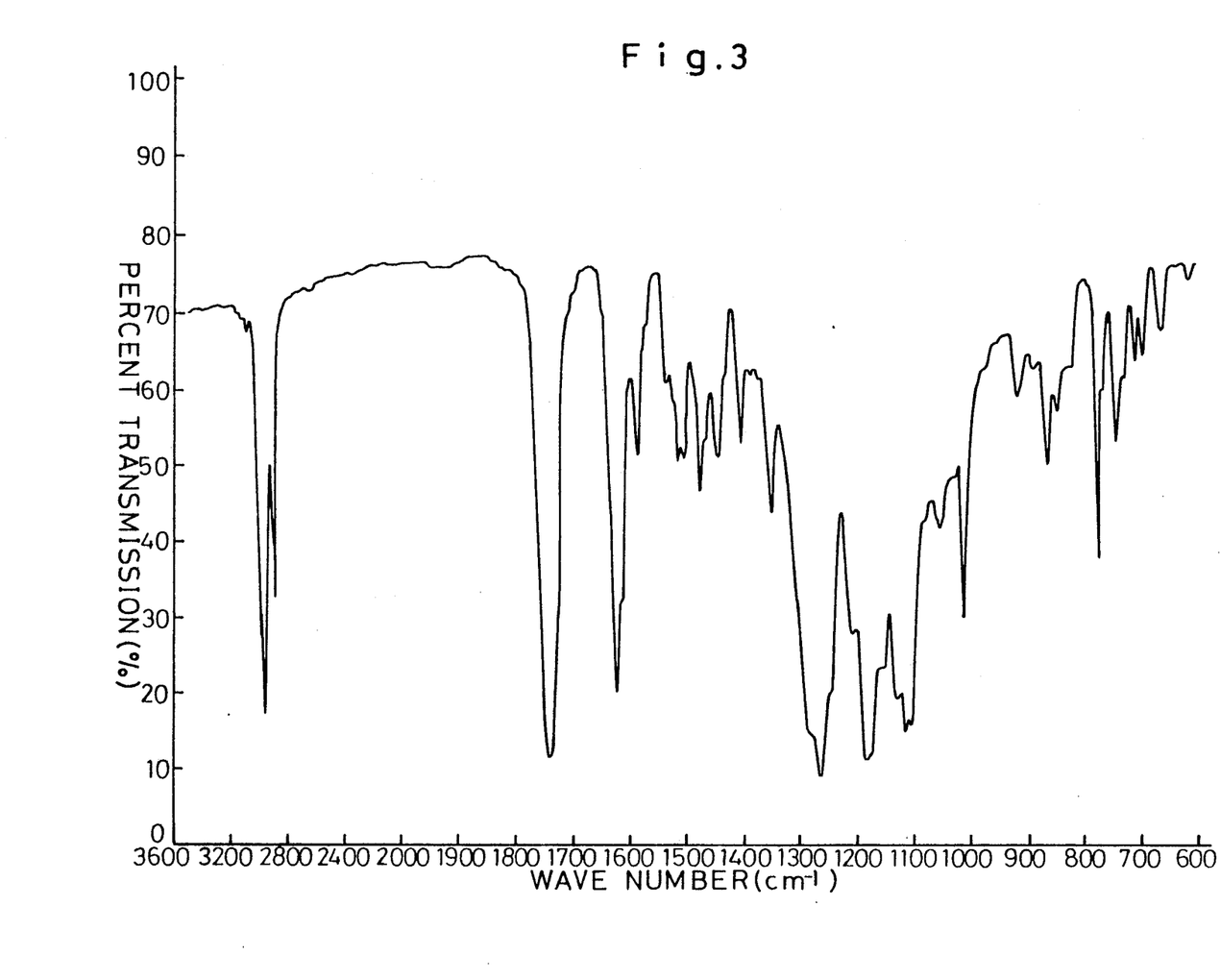
FIG. 3 is a similar view of the objective compound in Example 3.

|  | Infr. Red abs. Sp. | Nuc. mag. res. sp. |
|---|---|---|
| n = 8 (Exp. 4) | FIG. 1 | Table 1 |
| n = 9 (Exp. 5) | FIG. 2 | Table 2 |
| n = 10 (Exp. 3) | FIG. 3 | Table 3 |

|  | Sp.rot.pow. | Phase transition points |
|---|---|---|
| n = 8 (Exp. 4) |  | Cry →40 S(3)* →58.5 S$_A$ →87.7 I$_{SO}$ |
| n = 9 (Exp. 5) | = +35.5° | Cry →32 S(3)* →60 S$_A$ →91.9 I$_{SO}$ |
| n = 10 (Exp. 10) |  | Cry →26 S(3)* →46 S$_C$* →48 S$_A$ →94.7 I$_{SO}$ |

The infrared absorption spectra (KBr) as well as the nuclear magnetic resonance absorption spectra of said

TABLE 1

| Carbon | ppm | Remarks | Carbon | ppm | Remarks |
|---|---|---|---|---|---|
| 1 | 14.0 | methyl carbon | 16 | 122.3 | aromatic ring carbon |
| 2 | 22.6 | methylene carbon | 17 | 128.2 | " |
| 3 | 31.8 | " | 18 | 137.4 | " |
| 4 | 29.3 | " | 19 | 145.6 | " |
| 5 | 26.0 | " | 20 | 127.1 | " |
| 6 | 29.0 | " | 21 | 130.5 | " |
| 7 | 68.9 | neighbouring methylene carbon | 22 | 127.6 | " |
| 8 | 165.0 | neighbouring aromatic ring carbon | 23 | 164.8 | ester carbon |
| 9 | 110.8 | aromatic ring carbon | 24 | 70.2 | F3 substituted methyl neightbouring methine carbon |
| 10 | 133.8 | " | 25 | 124.1 | F3 substituted methyl carbon |
| 11 | 109.8 | " | 26 | 28.1 | methylene carbon |
| 12 | 163.9 | F substituted aromatic ring carbon | 27 | 24.6 | " |
| 13 | 102.9 | aromatic ring carbon | 28 | 28.8 | " |
| 14 | 162.1 | ester carbon | 29 | 31.5 | " |
| 15 | 151.1 | aromatic ring carbon |  |  |  |

TABLE 2

| Carbon | ppm | Remarks | Carbon | ppm | Remarks |
|---|---|---|---|---|---|
| 1 | 14.0 | methyl carbon | 16 | 122.3 | aromatic ring carbon |
| 2 | 22.6 | methylene carbon | 17 | 128.2 | " |
| 3 | 31.9 | " | 18 | 137.4 | " |
| 4 | 29.4 | " | 19 | 145.6 | " |
| 5 | 26.0 | " | 20 | 127.1 | " |
| 6 | 29.0 | " | 21 | 130.5 | " |
| 7 | 68.9 | neighbouring methylene carbon | 22 | 127.6 | " |
| 8 | 164.9 | neighbouring aromatic ring carbon | 23 | 164.8 | ester carbon |

TABLE 2-continued

| Carbon | ppm | Remarks | Carbon | ppm | Remarks |
| --- | --- | --- | --- | --- | --- |
| 9 | 110.8 | aromatic ring carbon | 24 | 70.2 | F3 substituted methyl neightbouring methine carbon |
| 10 | 133.8 | " | 25 | 124.0 | F3 substituted methyl carbon |
| 11 | 109.8 | " | 26 | 28.2 | methylene carbon |
| 12 | 163.9 | F substituted aromatic ring carbon | 27 | 24.6 | " |
| 13 | 102.9 | aromatic ring carbon | 28 | 28.8 | " |
| 14 | 162.4 | ester carbon | 29 | 31.5 | " |
| 15 | 151.1 | aromatic ring carbon | | | |

TABLE 3

| Carbon | ppm | Remarks | Carbon | ppm | Remarks |
| --- | --- | --- | --- | --- | --- |
| 1 | 14.0 | methyl carbon | 16 | 122.3 | aromatic ring carbon |
| 2 | 22.6 | methylene carbon | 17 | 128.2 | " |
| 3 | 31.9 | " | 18 | 137.3 | " |
| 4 | 29.4 | " | 19 | 145.6 | " |
| 5 | 26.0 | " | 20 | 127.1 | " |
| 6 | 29.0 | " | 21 | 130.5 | " |
| 7 | 68.8 | neighbouring methylene carbon | 22 | 127.6 | " |
| 8 | 164.9 | neighbouring aromatic ring carbon | 23 | 164.8 | ester carbon |
| 9 | 110.9 | aromatic ring carbon | 24 | 70.2 | F3 substituted methyl neightbouring methine carbon |
| 10 | 133.8 | " | 25 | 124.1 | F3 substituted methyl carbon |
| 11 | 109.8 | " | 26 | 28.1 | methylene carbon |
| 12 | 163.9 | F substituted aromatic ring carbon | 27 | 24.6 | " |
| 13 | 102.9 | aromatic ring carbon | 28 | 28.8 | " |
| 14 | 162.2 | ester carbon | 29 | 31.5 | " |
| 15 | 151.1 | aromatic ring carbon | | | |

EXAMPLE 6

In a liquid crystal cell casing of a thickness of 2.9 μm having indium/tinoxide film, the liquid crystal compound obtained in Example 1 was filled in isotropic phase, which was placed relative to a polarizing microscope having a photomultiplier of two polarizing plates arranged to make the right angle with each other in such a way that the molecular apsis makes the angle of 22.5° relative to the polarizer when there is no impressed voltage.

Figure 4:
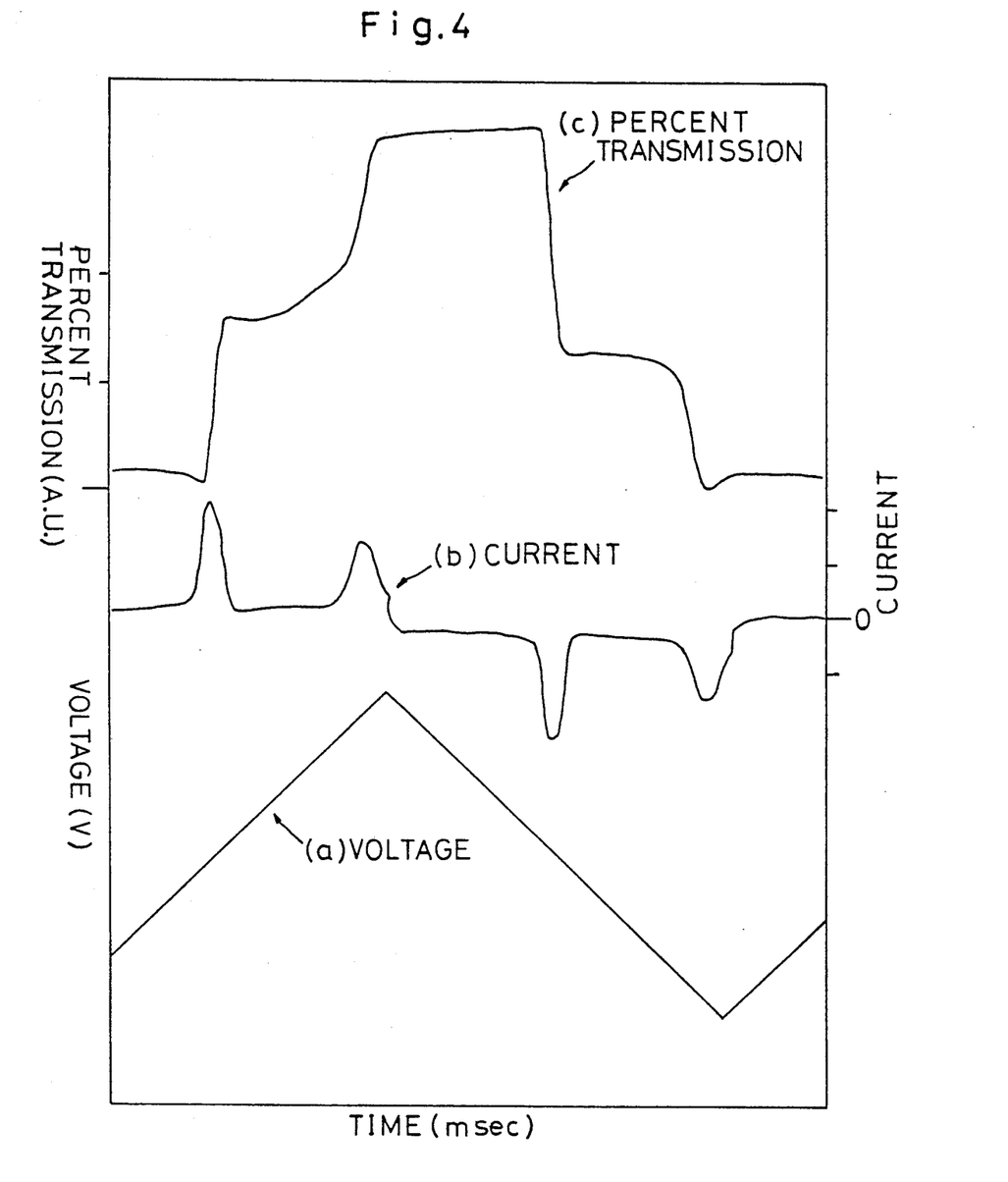
FIG. 4 is a diagram in which (a) represents triangle wave voltage impressed on the electrooptical element of the liquid crystal according to the invention, (b) represents inverted polarization current varied depending thereon and (c) represents percent transmission varied depending on said triangle wave voltage.

The liquid crystal cell was gradually cooled by a gradient of 0.1°–1.0° C./min. down to be in $S_{(3)}^*$ phase. In the range of 82°–25° C., a triangular wave voltage of ±30 V, 10 Hz was impressed so as to observe change of the percen transmission as shown by a curve in FIG. 4 (C), namely a dark state corresponding to the voltage minus state, a medium state corresponding to the 0 volt state and a light state corresponding to the voltage plus state. The inverted polarization current (b) showed peaks corresponding thereto. Thereby it was confirmed that the liquid crystal compound in Example 1 showed three stable states of crystal molecule orientation.

As to the other liquid crystal compounds of the other Examples, the similar results were observed.

What is claimed is:

1. A liquid crystal compound having an S*(3) phase which shows an electro-optically tristable state under applied electric voltage which is represented by the formula:

wherein n is an integer of 3–18, m is an integer of 5–12 and * represents an optically active center.

2. A liquid crystal compound as in claim 1, in which is in the S*(3) phase wherein the compound shows an optically tristable state under applied electric voltage.

3. A liquid crystal compound as in claim 1, which is an optically active 4-(1,1,1,-tri-fluoro-2-octyloxycarbonyl)phenyl 3'-fluoro-4'-n-decyl-oxybiphenyl-4-carboxylate represented by the formula:

4. A liquid crystal compound as in claim 3, which is in the S*(3) phase wherein the compound shows an optically tristable state under applied electric voltage.

5. A liquid crystal compound in claim 1, which is an optically active 4-(1,1,1-trifluoro-2-decycloxycarbonyl)phenyl 3'-fluoro-4-'-n-decyloxycarbonyl-4-carboxylate represented by the formula;

6. A liquid crystal compound as in claim 5, which is in the S*(3) phase wherein the compound shows an optically tristable state under applied electric voltage.

7. A liquid crystal compound having an S*(3) phase showing an electro-optically tristable state under applied electric voltage which is represented by the formula:

wherein n is an integer of 3-18, m is an integer of 5-12 and * represents an optically active center.

8. A liquid crystal compound as in claim 7, which is in the S*(3) phase wherein the compound shows an optically tristable state under applied electric voltage.

9. A liquid crystal compound in claim 7, which is an optically active 4'-(1,1,1-trifluoro-2-octyloxycarbonyl)-biphenyl-(4) 2-fluoro-4-n-decycloxybenzoate represented by the formula;

10. A liquid crystal compound as in claim 9, which is in the S*(3) phase wherein the compound shows an optically tristable state under applied electric voltage.

11. A liquid crystal compound in claim 7, which is an optically active 4-(1,1,1-trifluoro-2-octyloxycarbonyl)-biphenyl-(4) 2-fluoro-4-n-octyloxybenzoate represented by the formula;

12. A liquid crystal compound as in claim 11, which is in the S*(3) phase wherein the compound shows an optically tristable state under applied electric voltage.

13. A liquid crystal compound as in claim 7, wherein the compound is an optically active 4'-(1,1,1-tri-fluoro-2-octyloxycarbonyl)biphenyl-(4)2-fluoro-4-n-nonyloxybenzoate represented by the formula:

14. A liquid crystal compound as in claim 13, which is in the S*(3) phase wherein the compound shows an optically tristable state under applied electric voltage.

* * * * *